United States Patent [19]
Longshore

[11] 3,763,947
[45] Oct. 9, 1973

[54] TRACTOR FOUR WHEEL DRIVE

[75] Inventor: Donald W. Longshore, New Berlin, Wis.

[73] Assignee: Allis-Chalmers Corporation, Milwaukee, Wis.

[22] Filed: Sept. 21, 1971

[21] Appl. No.: 182,376

[52] U.S. Cl. .................................. 180/44 R, 74/325
[51] Int. Cl. ............................................ B60k 17/06
[58] Field of Search ...................... 180/44 R; 74/325

[56] References Cited
UNITED STATES PATENTS

| | | | |
|---|---|---|---|
| 2,314,833 | 3/1943 | Keese | 180/44 R |
| 2,775,903 | 1/1957 | Reed | 74/325 |
| 2,436,746 | 2/1948 | Drought | 74/325 |

*Primary Examiner*—Kenneth H. Betts
*Assistant Examiner*—J. M. McCormack
*Attorney*—Arthur L. Nelson et al.

[57] ABSTRACT

A four wheel drive for a vehicle having means for synchronizing the ground speeds of the front wheels and the rear wheels through selectively different drive ratios between the front and rear wheels as the front wheel rolling radius is changed.

10 Claims, 5 Drawing Figures

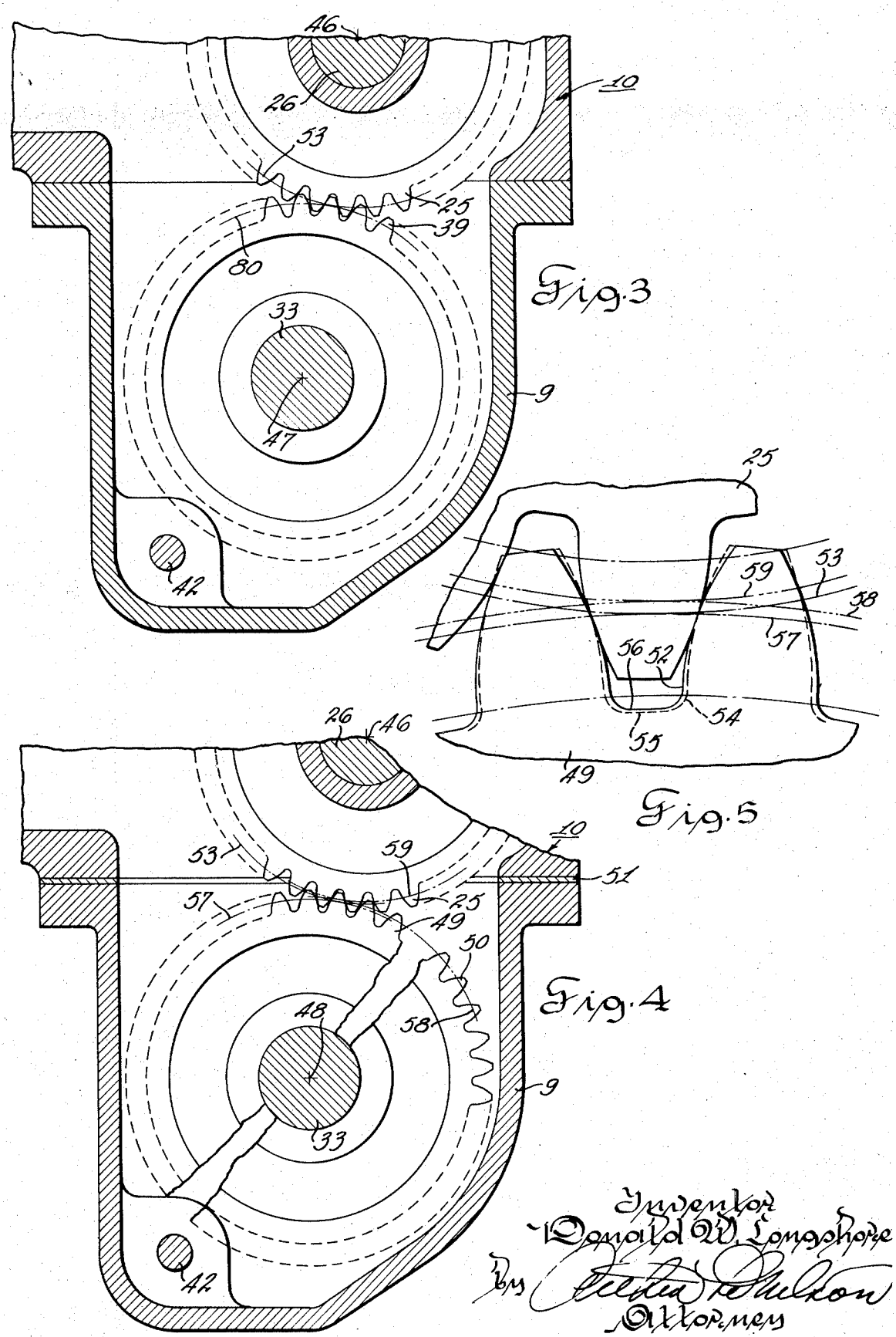

TRACTOR FOUR WHEEL DRIVE

This invention relates to a four wheel drive vehicle and more particularly to selectively changing the drive ratio to the front wheels to synchronize the ground speed of the front and rear wheels with changing of rolling radius of the front wheels.

The conventional rubber tired tractor drives through the rear wheels and under most circumstances the tractive effort delivered by the rear wheels is adequate for the work performed. Under unusual circumstances, however, where maximum traction is necessary, it is desirable to have additional tractive effort available on the front wheels. While mechanical front wheel drive does not require additional pumps and motors and hydraulic conduits to drive the front wheels, synchronizing means for sychronizing the ground speed of the front and rear tires may be necessary.

The ground speed of a wheel varies with the tire size, tread and inflation. Also with a change in tires on the front wheels or the rear wheels it becomes necessary to coordinate the ground speed for each of the tires. The optimum condition for ground speed of the tires is where the front tires are slightly faster than the ground speed of the rear wheels. This speed should be between 0-2 percent faster than the rear wheels so the front wheels have a tendency to pull the tractor. It is understood that during normal operation of the tractor a certain amount of slippage is inherent while the tractor is pulling. This must also be accounted for in determining the tire speed of the front and rear wheels. Travel reduction speed due to slippage has been recorded between 10 and 20 percent so that the front and rear wheels will always contribute to the drawbar pull, even though they are not travelng at the same speed, but for most ideal operations, as previously indicated, it is preferable to have the front wheels traveling slightly faster than the rear wheels which provide for more stability and better control of the tractor during operation.

Accordingly, some means must be provided to vary the speed ratio between the front and rear wheels to provide optimum ground speed between the front wheels and the rear wheels under all conditions. Accordingly, this invention provides a means in the front wheel drive which will selectively vary the speed ratio to the front wheel drive and control the ground speed of the front wheels relative to the rear wheels to provide optimum operating conditions and maximum traction in a mechanical four wheel drive.

It is an object of this invention to provide a four wheel drive for a vehicle having means for changing the drive ratios of the front wheels relative to the rear wheels to provide the desired tire speed relationship on the ground surface between the front and rear wheels.

It is another object of this invention to provide a four wheel drive with a power transmission driving to the rear wheels and a power transfer to the front wheel having means for changing the gear ratio to accommodate a selected change in rolling radius of the front wheels.

It is a further object of this invention to provide a four wheel drive on a vehicle and more particularly for selectively changing the gear ratio to the front wheels relative to the rear wheels with change in tire sizes of the front wheels with relation to the rear wheels.

It is a further object of this invention to provide a four wheel drive in a vehicle with means for selectively positioning a gear of selected number of gear teeth rotating on selected gear centers to drive the front wheels at a predetermined ground engaging speed relative to the rear wheels to provide optimum traction for the vehicle.

The objects of this invention are accomplished by providing a power transmission and rear drive assembly for driving the rear wheels of the vehicle. A transfer gearbox mounted on the transmission and receiving power from the transmission drives a propeller shaft for driving the front wheels at a predetermined speed ratio. The transfer gearbox includes a driven gear driven by a driving gear in the transmission with the gears operating on selected gear centers with means for mounting a driven gear on one of at least two gear centers. The driven gear is one of a selected number of gears each having a selected number of gear teeth to provide different gear ratios for driving the front wheels. The tooth profiles of each of the selected gears vary slightly to accommodate operating with different pitch diameters to thereby provide a means for changing the gear ratio to drive the front wheels with relation to the rear wheels.

The speed ratios of the front and rear wheels operate within predetermined limits in order to provide the desired traction and to reduce tire wear. This provides the optimum ground traversing relationship between the front and rear wheels.

The preferred embodiments of this invention are illustrated in the attached drawings.

FIG. 3 is a cross section view taken on line III—III of FIG. 2.

FIG. 4 is a modification of a cross section view similar to FIG. 3.

FIG. 5 is a cross section view illustrating tooth profiles of gears with the driven gear in the transfer gear case operating with different pitch diameters and having different numbers of teeth.

Figure 1:
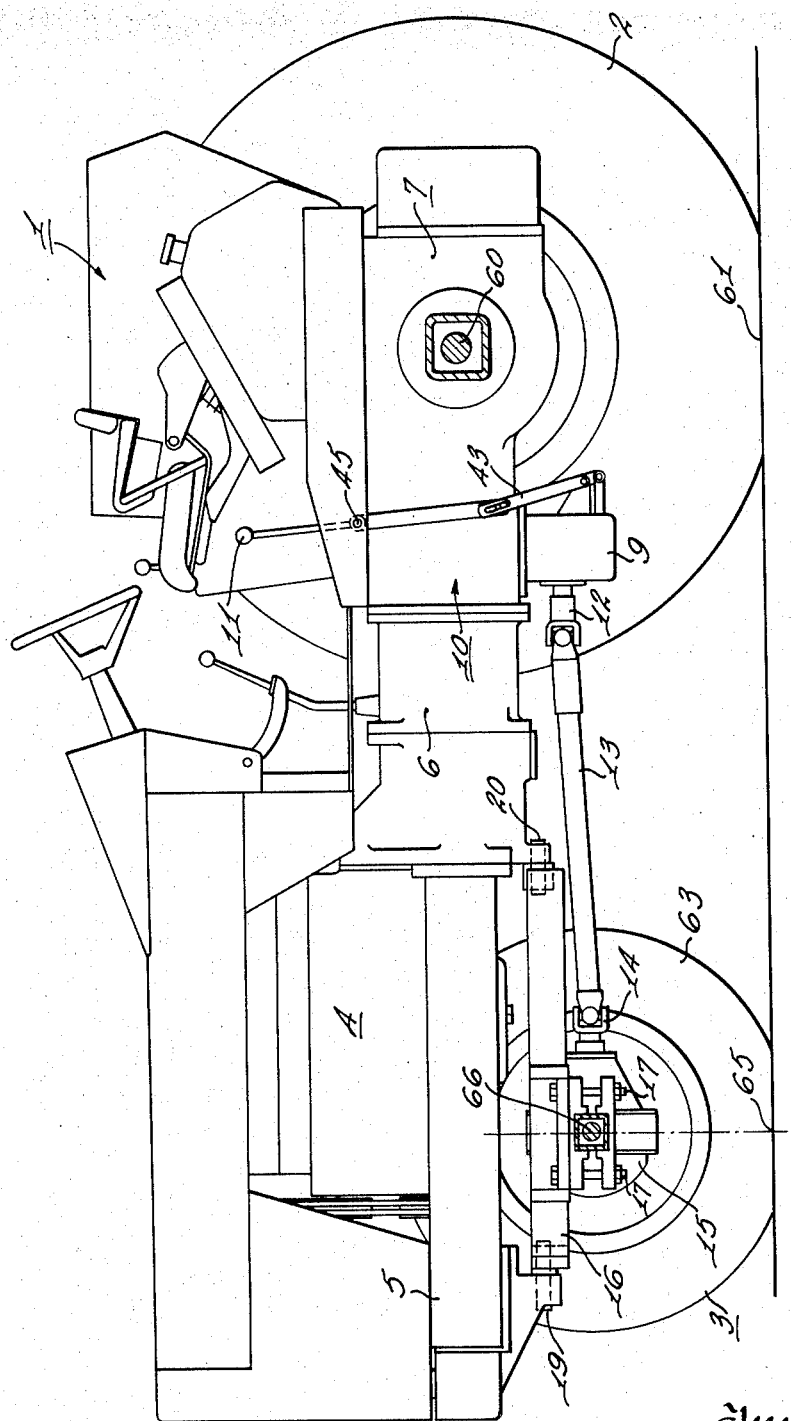
FIG. 1 illustrates a side elevation view of the vehicle with two wheels removed to more clearly show the relationship of the drive mechanism.

Referring to the drawings, a tractor 1 is mounted on a pair of rear wheels 2 and a pair of front wheels 3. The engine 4 mounted on the chassis 5 drives through the transmission 6 and the rear end drive assembly 7 to the rear wheels 2. The transfer gear casing 9 is mounted on the underside of transmission housing 10.

A suitable control lever 11 is pivotally mounted on the housing 10 for selectively engaging the front wheel drive. The front wheel drive includes the drive shaft 12 driving the propeller shaft 13 which drives through universal joint 14 to drive into the front axle assembly 15. The front axle assembly 15 is rigidly secured to the front axle frame 16 by means of the bolts 17. The front axle frame 16 is pivotally connected with the chassisc 5 by the pivotal assemblies 19 and 20. The steering of the drive wheels is accomplished by a suitable steering mechanism.

The vehicle is driven through a transmission and rear drive assembly. Since the drive to the rear wheels is generally conventional, only a portion of the power train for driving the rear wheels is shown.

Figure 2:
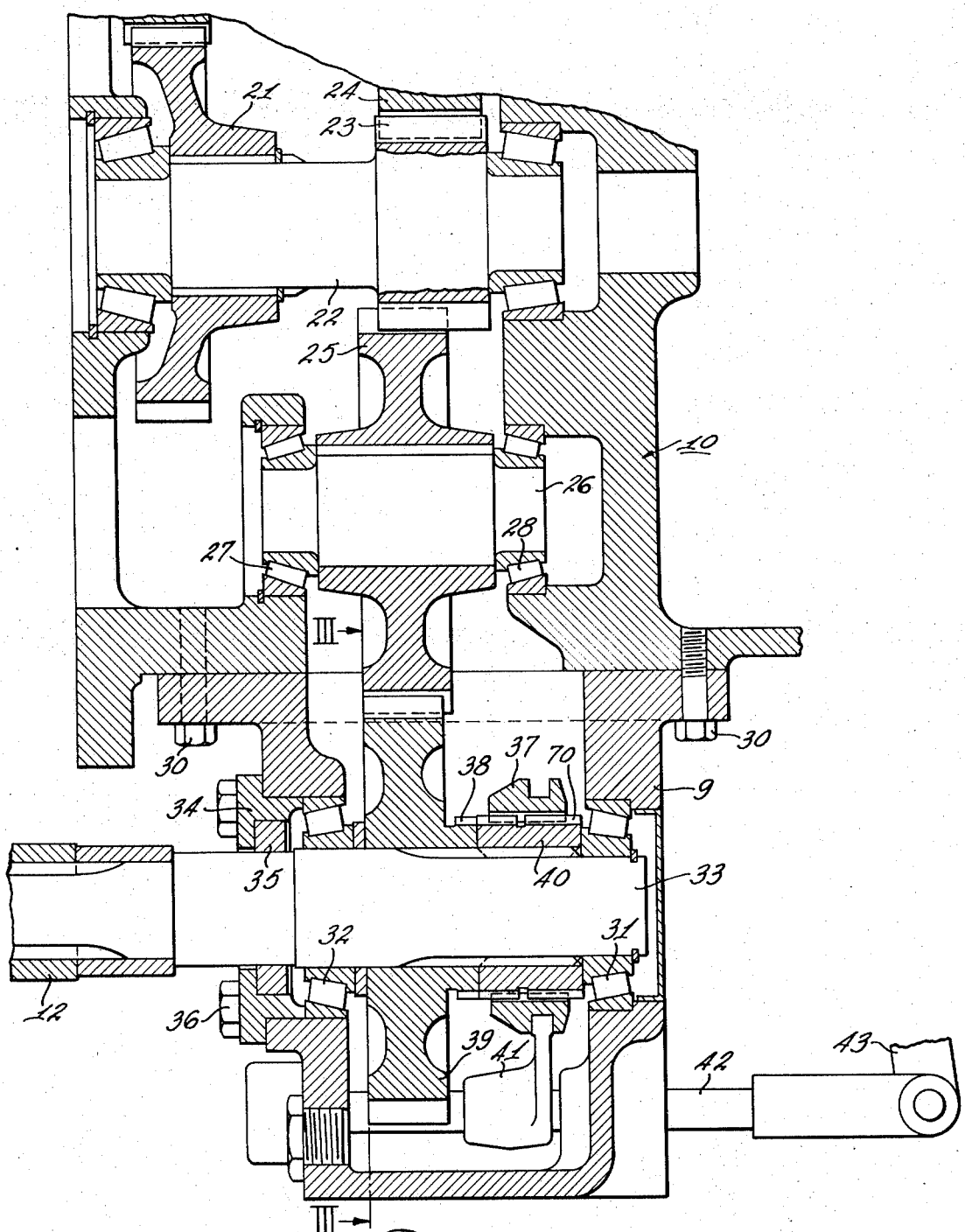
FIG. 2 is a cross section view taken through a portion of the transmission and the transfer gear case.

Referring to FIG. 2, the housing 10 supports the drive train including gear 21 on shaft 22 driving the pinion 23. The pinion 23 in turn drives the gear 24 in the power train for driving the rear wheels.

Pinion 23 also drives the gear 25 mounted on the shaft 26. Shaft 26 is embraced by the bearing assemblies 27 and 28 mounted in the housing 10. Gear 25 provides a power take-off for driving the front end drive. The gear 25 provides a power take-off for the front wheel drive. The transfer gear case 9 is fastened to the transmission housing 10 by means of a plurality of bolts 30. The transfer gear case supports the bearing assemblies 31 and 32 which rotatably support the stub shaft 33. The bearing retainer 34 carries the seal 35 and is bolted to the transfer gear case 9 by the bolts 36.

Clutch collar 37 slidably engages the clutch teeth 38 of gear 39. The internal periphery of the clutch collar 37 is splined and slides on the splined periphery of the clutch sleeve 40. Clutch sleeve 40 in turn has mating splined portions to engage the splined external periphery of shaft 33. A shifting fork 41 slides the clutch collar 37 to engage and disengage the gear 39 with the shaft 33. The fork 41 is connected to the rod 42 and operated by the clutch link 43. The link 43 in turn is connected to the clutch control lever 11 which is pivotally supported by the pin 45 on the vehicle chassis 5.

FIG. 3 is a cross section view taken on line III—III of FIG. 2. FIG. 3 illustrates a 36 tooth drive gear 25 driving a 37 tooth driven gear 39 in the transfer gear case 9. The gear case 9 is fastened to the housing 10 without any spacers between the mounting surfaces of gear case 9 and housing 10. The gear centers 46 and 47 are designed to operate with the spacing provided for as shown in FIG. 3.

FIG. 4 illustrates the gear 25 operating on the same gear center 46. The gear center 48, however, of gears 49 and 50 has been moved downwardly due to the use of a shim 51 between the abutting surfaces of the transmission housing 10 and transfer gear case 9. Gears 49 and 50 are designed to operate with the same gear center relative to gear 25. Gear 49 is cut in a manner similar to the gear 39 and operates with gear 25. Gear 25 operates with the same pitch circle 53 when operating with gear 39 or gear 49. The gear profile for gear 49 is shown in FIG. 5 by the solid profile line 52. The pitch circle for gear 25, which is the 36 tooth gear, is shown by the line 53 when operating with gears 39 or 49. Gears 39 and 49 operate with pitch circles 80 and 57 coacting with pitch circle 53 of gear 25.

Gear 50 operates on the same gear center 48 as does gear 49. Gear 50, however, is a 39 tooth gear. Gear 50 has a tooth profile as indicated by the profile line 54, as shown in FIG. 5. The gear 50 tooth spacing, being the space between the contact surfaces on the teeth of gear 50 with gear 25, is essentially the same as the tooth spacing between the contact surfaces of gear 49 with gear 25. It is noted, however, that the gear teeth of gear 50 are thinner and extend for a small proportion of the circular pitch than on gear 49. When the tooth was formed, the hob cut more deeply to form a deeper root 55 of gear 50 than the root 56 of gear tooth 49. The modified construction of gear 50 decreases the operating pitch circle of gear 25 while the operating pitch circle of gear 50 is greater than the operating pitch circle for gear 49. It is optional to construct gear 49 in a manner similar to the gear 50 construction for operation on the same gear center as gear 39 and without the use of shim 51.

Gear 25 operates on the operating pitch circle 59 while operating with gear 50 which operates with a pitch circle 58. Gears 49 and 50, however, operate on the same gear center 48 and a constant gear center is maintained for gear 25. Accordingly, gear 25 operates on an operating pitch circle 53 with gear 49 and a pitch circle 59 for gear 50. The difference in the operating pitch circles is due to the fact that the teeth of gear 50 have a deeper root 55 and the gear teeth are thinner.

Accordingly, without the shim 51 gear 25 having 36 teeth operates with gear 39 having 37 teeth. With the shim positioned between the housing and gear case, gear 25 operates on the same pitch circle 53 with the gear 49 which has 38 teeth. Although the pitch circle 57 of gear 49 is larger, the gear center 48 has been moved outwardly from the gear center 47 of gear 39.

Instead of using another shim between the transfer gear case 9 and the transmission housing 10 for use with the gear 50, the gear teeth of gear 50 are cut narrower to provide a means for operating gear 50 on the same gear center 48 as for gear 49.

The operation of the four wheel drive will be described in the following paragraphs.

The engine 4 provides a source of power for driving the vehicle. The gear 23 drives through gear 24 in the transmission to drive the rear wheels 2. The rear wheels 2 operate at a rolling radius which is essentially the radius between the center of the drive shaft 60 and the contact point 61 of the tires of the rear wheel 2 with ground. The rolling radius of the rear wheels 2 will determine the speed of the forward movement of the vehicle. Accordingly, the tires 63 on the front wheel 3 must also have a ground speed at the point of contact 65 of the front wheel which is substantially the same as the ground speed of the point of contact 61 of the rear tire. Accordingly, the rolling radius of the front wheel will be a distance from the center line of the axle 66 and the contact with the ground 65. It is understood that the rolling radius of either wheel can be changed from normal inflation by overinflating or underinflating the tires. The rolling radius is also changed when a front wheel carries a tire of a thicker tread than a conventional tread. Accordingly, the wear on the tread also affects the rolling radius of the wheel.

For operation under normal conditions, the vehicle has adequate traction on the rear wheels to accommodate the draft load which is applied to the tractor. In this position the clutch collar 37 is positioned as shown, with the clutch collar 37 moved rearwardly so that the teeth 38 of the gear 39 are not engaged. In this position only the rear wheels can drive the vehicle and the front wheels do not provide any tractive effort.

When it is desired to increase the traction of the vehicle by use of the four wheel drive, the clutch collar 37 is moved forwardly by actuation of the clutch lever 11 which in turn is adapted to move the clutch collar 37 forwardly. In this position the teeth 70 of the clutch sleeve 40 remain engaged with the clutch collar 37, while the clutch collar 37 engages the teeth 38 of gear 39. With engagement of the clutch, the front wheel drive is then in operation.

The FIGS. 2 and 3 illustrate a normal drive for the front wheel drive mechanism. Gear 25 drives through gear 39. For the purpose of illustration gear 25 has 36 teeth while the gear 39 has 37 teeth. Gear 39 drives the stub shaft 33 which is connected to the propeller shaft 13. The propeller shaft 13 drives through the universal joint 14 driving the front axle assembly 15 and in turn rotating the front wheels 3. Under these conditions, both the front and rear wheels are rotated providing traction for the vehicle. With the front wheels and rear wheels driving, the ground speed where a tire meets the terrain are traveling at substantially the same speed, or preferably the front wheel is traveling at between 0–2 percent faster than the ground speed of the rear wheels.

When a larger rolling radius of the tires on the front wheel is used on the tractor, then a slower gear ratio is necessary to match the ground speed between the front and rear tires. Accordingly, the transfer gear case 9 is then removed and the gear 39 is replaced by gear 49 which has an additional tooth on its periphery. The additional tooth increases the pitch circle of gear 49 with relation to gear 39, and accordingly, when the transfer housing is reassembled on the transmission housing 10, the shim 51 is placed between the engaging surfaces of the transmission housing 10 and transfer gear case 9. This increases the distance between the gear centers 46 and 48 to accommodate the increased pitch circle of gear 49. The gears then operate on pitch circles as indicated by pitch circle 53 for gear 25, and the pitch circle 57 for gear 49. The pitch circle 53 of gear 25 remains the same for operation with gear 49. The angular rotation of the front wheels is decreased slightly, although the ground speed remains substantially the same as with operation, as previously described. The provision of a gear 49 having 38 teeth, as contrasted to gear 39 which has only 37 teeth, provides a means for correlating ground speeds of the different tire sizes.

If an even larger tire for the front wheel is used or a tire with a new tread, or a thicker tread than ordinarily used, the speed of rotation of the front wheels must be decreased further to correlate ground speed between the front and rear wheels. Accordingly, the transfer housing 9 is removed from the vehicle and the gear 49 is replaced with the gear 50 and when the transfer case is again assembled on the transmission housing, the shim 51 is inserted between the abutting surfaces of the transmission housing and transfer gear case 9.

It is noted that the gear 50 has a deeper root on the tooth profiles than gear 49. This in turn increases the effective pitch circle. The effective pitch circle 59 of gear 25 is decreased while gear 50 operates on a pitch circle 58. This again decreases the angular velocity of the front wheels and correlates the ground speed of the front wheels with the rear wheels. The manner in which the gear is cut permits use of the same dimension between gear center 25 and 50 as between gear centers 25 and 49, although the effective pitch circle changes due to the different profile of the teeth on gear 50.

The change-over may be provided in the field, and it is not necessary that the tractor be returned to the factory to permit the use of different sizes of tires on the front wheels. The change-over provides a means of compensating for wear on either the front or rear wheels and does not necessitate the replacement of all four tires at one time.

The preferred embodiments of this invention have been illustrated and described.

The embodiments of the invention in which an exclusive property or privilege is claimed are defined as follows:

1. A four wheel drive for a vehicle comprising, a power transmission adapted for connection to an engine including a drive gear, a pair of rear wheels defining a predetermined rolling radius, a rear drive assembly for transmitting power from said transmission to said rear wheels, a pair of front wheels defining a predetermined rolling radius, a front wheel drive mechanism for driving said front wheels, a power transfer mechanism connected between said front wheel drive mechanism and said transmission including, a driven gear meshing with said drive gear, means selectively changing the operating pitch circle of said driven gear relative to said drive gear including, a transfer gear case, means supporting said driven gear in said transfer gear case selectively at any one of a number of gear centers, said driven gear selectively including any one of a number of gears each including a different number of gear teeth, and each driven gear defining teeth of any one selected tooth thickness of a plurality of tooth thicknesses to thereby selectively change the operating pitch circle of said driven gear by selective and alternative changing of the gear center position of said driven gear or changing the operating pitch circles of said drive gear and said driven gear by changing of the tooth thickness of said driven gear to provide one of a selected number of gear ratios from said transmission through said front wheel drive mechanism to provide a predetermined ground speed of the front wheels relative to the rear wheels to compensate for any change in rolling radius of the front wheels.

2. A four wheel drive for a vehicle as set forth in claim 1 including a transmission housing supporting said drive gear, said transfer gear case mounted on said housing rotatably supporting said driven gear at a first gear center with said driven gear defining a predetermined number of gear teeth thereby providing a first speed ratio for driving the front wheels.

3. A four wheel drive for a vehicle as set forth in claim 1 including a transmission housing supporting said drive gear, a shim mounted between said transfer gear case and said transmission housing to position said driven gear at a second gear center, said driven gear defining said predetermined number of gear teeth plus one to thereby provide a second speed ratio for driving said front wheels.

4. A four wheel drive for a vehicle as set forth in claim 1 including a transmission housing supporting said drive gear, a shim positioned between said transmission housing and said transfer gear case for positioning said driven gear at a second gear center, said driven gear including said predetermined number of gear substantially plus two, said driven gear defining gear teeth of less thickness than said drive gear to accommodate operation on said second gear center and for providing a third speed ratio for driving the front wheels.

5. A four wheel drive for a vehicle as set forth in claim 1 wherein said drive gear and said driven gear define a circular pitch substantially equal to twice the circular tooth thickness on the operating pitch circle.

6. A four wheel drive for a vehicle as set forth in claim 1 wherein the driven gear defines a circular pitch substantially greater than twice the circular thickness of a gear tooth on the operating pitch circle of said driven gear.

7. A four wheel drive for a vehicle as set forth in claim 1 wherein the circular pitch is substantially greater than twice the circular tooth thickness thereby shifting the operating pitch circle away from the gear center of said driven tooth and shifting the operating pitch circle toward the gear center of said drive gear to decrease the speed ratio from the drive to the driven gear.

8. A four wheel drive for a vehicle as set forth in claim 1 wherein said drive defines a circular pitch equal to substnatially twice the circular tooth thickness, said driven gear defining a circular pitch substantially greater than twice the circular tooth thickness to thereby provide a short addendum tooth for said driven gear.

9. A four wheel drive for a vehicle as set forth in claim 1 wherein said driven gear defines a circular pitch substantially greater than twice the circular tooth thickness, said driven gear defines a short addendum tooth profile to effectively increase the operating pitch circle of said driven gear relative to said drive gear.

10. A four wheel drive for a vehicle as set forth in claim 1 wherein said means supporting said driven gear includes a transmission housing, said transfer gear case, a shim positioned between said transmission housing and said transfer gear case to define a gear center for said driven gear, said driven gear defines a circular pitch substantially greater than twice the circular tooth thickness to thereby define a short addendum tooth profile for effectively increasing the operating pitch circle of said driven gear.

* * * * *

PO-1050
(5/69)

UNITED STATES PATENT OFFICE
CERTIFICATE OF CORRECTION

Patent No. 3,763,947        Dated October 9, 1973

Inventor(s) Donald W. Longshore

It is certified that error appears in the above-identified patent and that said Letters Patent are hereby corrected as shown below:

Column 6, claim 4, line 49, "substantially" should be --- teeth ---;

Column 7, claim 8, line 5, after "drive" insert --- gear ---;

Column 7, claim 8, line 6, "substnatially" should be --- substantially ---.

Signed and sealed this 1st day of October 1974.

(SEAL)
Attest:

McCOY M. GIBSON JR.
Attesting Officer

C. MARSHALL DANN
Commissioner of Patents